United States Patent
McGoey (10) Patent No.: US 6,469,271 B1
(45) Date of Patent: Oct. 22, 2002

(54) METHOD AND APPARATUS FOR REFURBISHING VALVES

(75) Inventor: Lennard J. McGoey, Mississauga (CA)

(73) Assignee: Kinectrics Inc., Toronto (CA)

( * ) Notice: Subject to any disclaimer, the term of this patent is extended or adjusted under 35 U.S.C. 154(b) by 0 days.

(21) Appl. No.: 09/843,711

(22) Filed: Apr. 30, 2001

(51) Int. Cl.⁷ ................................................ B23K 9/04
(52) U.S. Cl. ............................... 219/76.14; 219/76.12; 219/125.11; 29/402.07; 29/890.121
(58) Field of Search ........................... 219/76.12, 76.14, 219/125.11; 29/402.07, 402.18, 890.121, 890.122, 890.131, 890.132, 890.129

(56) References Cited

U.S. PATENT DOCUMENTS

| | | |
|---|---|---|
| 2,903,564 A | 9/1959 | Carr |
| 3,159,106 A * | 12/1964 | Schumbacker et al. .. 219/76.11 |
| 3,975,810 A | 8/1976 | Siepmann |
| 4,079,491 A | 3/1978 | Richardson |
| 4,160,895 A | 7/1979 | Hopper |
| 4,531,039 A | 7/1985 | Okano et al. |
| 4,593,445 A | 6/1986 | Snyder et al. |
| 4,621,762 A * | 11/1986 | Bronowski ................... 164/509 |
| 4,647,749 A * | 3/1987 | Koshy ......................... 137/375 |
| 4,856,390 A | 8/1989 | Ricci |
| 4,894,505 A * | 1/1990 | Malone et al. ........... 219/76.11 |
| 5,558,268 A * | 9/1996 | Acheson ................ 219/125.11 |
| 5,711,343 A | 1/1998 | Beckett |
| 5,826,336 A | 10/1998 | Schmitz |

OTHER PUBLICATIONS

Climax Machine Tools, Inc., "Climax Portable Machine Tools", pp. 1–8, 2000.

* cited by examiner

Primary Examiner—M. Alexandra Elve
Assistant Examiner—Kevin McHenry
(74) Attorney, Agent, or Firm—Ridout & Maybee LLP (57) ABSTRACT

A method and apparatus for in situ refurbishment of valve seats are disclosed in which a worn valve seat is initially ground to a flat surface, a buildup of weld metal is deposited on the flat surface, and the weld buildup is machined to the final dimensions of the valve seat. The apparatus comprises a machining apparatus for machining and machining of the valve seat, a gas metal arc welding apparatus for deposition of weld metal, and support structures to support the weld buildup as it is being formed. Preferably, the support structures are in the form of metal chill blocks which act both to support the buildup of weld metal and to act as heat sinks and remove excess heat from the buildup, resulting in a higher quality buildup of metal.

12 Claims, 7 Drawing Sheets

METHOD AND APPARATUS FOR REFURBISHING VALVES

FIELD OF THE INVENTION

This invention relates to an apparatus and a method for refurbishing valve seats, and is more particularly concerned with refurbishing valve seats of high temperature, high pressure safety valves in situ.

BACKGROUND OF THE INVENTION

High temperature, high pressure safety valves are commonly used throughout the steam systems of power generation plants. To maintain proper sealing, the valve seats of these valves must be regularly lapped to remove steam cutting and chattering damage. Once more than ¼ inch of material has been removed from the valve seat, the entire valve must be removed and replaced. Replacement of the valve involves cutting the worn valve from the pipes to which it is connected and installing a new or reconditioned valve in its place. This is a time-consuming, expensive procedure.

Several methods for in situ valve repair are known in the prior art. For example, U.S. Pat. No. 4,593,445 (Snyder et al.), issued on Jun. 10, 1986, describes an apparatus and method for remotely refurbishing valve seats in the steam chest of a turbine generator. The method described by Snyder comprises grinding away a sealing layer of the worn valve seat, building up the valve seat by deposition of weld metal using a gas tungsten arc welder including a solid wire feeder for feeding chromium-steel wire to the electrode. The next step of the process comprises machining of the buildup of weld metal to achieve the desired profile.

One disadvantage of the Snyder process is that, although, gas tungsten arc welding is believed to provide a higher quality weld than other welding processes, gas tungsten arc welding can also be significantly slower, particularly when producing a weld buildup of a metal such as stainless steel.

SUMMARY OF THE INVENTION

The present invention provides a method and apparatus for in situ refurbishment of valve seats in which the valve seat is taken down to a flat surface, a buildup of weld metal is deposited on the flat surface by gas metal arc welding, utilizing a consumable electrode, up to a height and width which is greater than the final dimensions of the valve seat, and the built up valve seat is then machined to its final dimensions.

The use of gas metal arc welding in the process of the present invention, rather than Gas tungsten arc welding as in the Snyder et al. patent, permits more rapid buildup of weld metal on the ground down surface of the valve seat, resulting in improved efficiency. In general, the use of gas metal arc welding permits a wider bead of weld metal to be laid down on the valve seat. In order to assist in maintaining the quality of the buildup, support structures are provided at the inner perimeter and outer perimeter of the valve seat to support the buildup as the weld metal is being laid down and to prevent roll over of the metal beads.

Furthermore, since the buildup of weld metal is laid down more rapidly in the method of the invention, the support structures preferably comprise solid chill blocks made of a metal such as copper or stainless steel which act as heat sinks to dissipate heat away from the buildup as it is being laid down. Preferably, a pair of chill blocks are provided, comprising an inner block in the form of a solid cylinder or a cylindrical sleeve or ring which is mounted in the hollow interior of the valve inward of the valve seat, and an outer chill block comprising two C-shaped rings which clamp around the upper end of the valve nozzle.

The use of support structures such as chill blocks permits a high quality buildup to be maintained through the use of gas metal arc welding.

Accordingly, in one aspect the present invention provides an apparatus for refurbishing a worn valve seat of a high temperature, high pressure safety valve in situ, the valve seat being generally circular and being provided at one end of a hollow, cylindrical valve nozzle which is attached to a valve body of said valve, said valve seat being accessible through an access opening in said valve body located above said valve seat, said apparatus comprising: (a) valve machining means mountable to said valve, said valve machining means having first cutter means extendable into the valve body through the access opening for initially machining the worn valve seat to a flat annular surface having an inner perimeter and an outer perimeter; (b) a gas metal arc welding apparatus mountable to the valve having a welding head with a consumable electrode, the welding head being extendable through the access opening and being rotatable in a circle located substantially parallel to and above the flat surface of the valve seat to deposit a buildup of weld metal from said consumable electrode onto said flat surface; and (c) a pair of metal support structures for supporting the buildup of weld metal as it is being deposited by the gas metal arc welding apparatus, said pair of support structures comprising: (i) an inner support structure which is positioned inwardly of the inner perimeter of the flat surface during deposition of the weld metal buildup and which has an outer, substantially vertical cylindrical surface which forms an inner support wall for the weld metal buildup, said inner support wall having a height sufficient to support the weld metal buildup; and (ii) an outer support structure which surrounds the outer perimeter of the flat surface during deposition of the weld metal buildup and which has an inner, substantially vertical cylindrical surface which forms an outer support wall for the weld metal buildup, said outer support wall being located proximate the outer perimeter of the flat surface and having a height sufficient to support the weld metal buildup; said valve machining means also having second cutter means extendable into the valve body through the access opening for machining the weld metal buildup to a desired final height and profile.

In another aspect, the present invention provides a method for refurbishing a worn valve seat of a high temperature, high pressure safety valve in situ, said valve seat being generally circular and being provided at one end of hollow, cylindrical valve nozzle which is attached to a valve body of said valve, said valve seat being accessible through an access opening in said valve body located above said valve seat, the method comprising: (a) initially machining the worn valve seat to a flat annular surface having an inner perimeter and an outer perimeter using a valve machining means mounted to the valve body and having cutter means extending into the valve body; (b) installing an inner support structure inwardly of the inner perimeter of the flat surface of the valve seat, said inner support structure having an outer, substantially vertical cylindrical surface which is located proximate the inner perimeter of the flat surface and extends above the flat surface to at least a predetermined height; (c) installing an outer support structure outwardly of the outer perimeter of the flat surface of the valve seat, said outer support structure having an inner, substantially vertical cylindrical surface which is located proximate the outer perimeter of the flat surface and extends above the flat surface to at least said predetermined height; (d) depositing a buildup of weld metal on said flat surface between said support structures, using a gas metal arc welding apparatus mounted to the valve and having a welding head with a consumable electrode extending through the access opening into the valve body, the buildup of weld metal being deposited while rotating the welding head in a circle substantially parallel to and above the flat surface of the valve seat so as to deposit a buildup of uniform thickness to approximately the predetermined height; and (e) machining the buildup of weld metal to the final desired height, thickness and profile of the refurbished valve seat.

BRIEF DESCRIPTION OF THE DRAWINGS

The invention will now be described, by way of example only, with reference to the accompanying drawings in which.

DETAILED DESCRIPTION OF PREFERRED EMBODIMENTS

Figure 1:
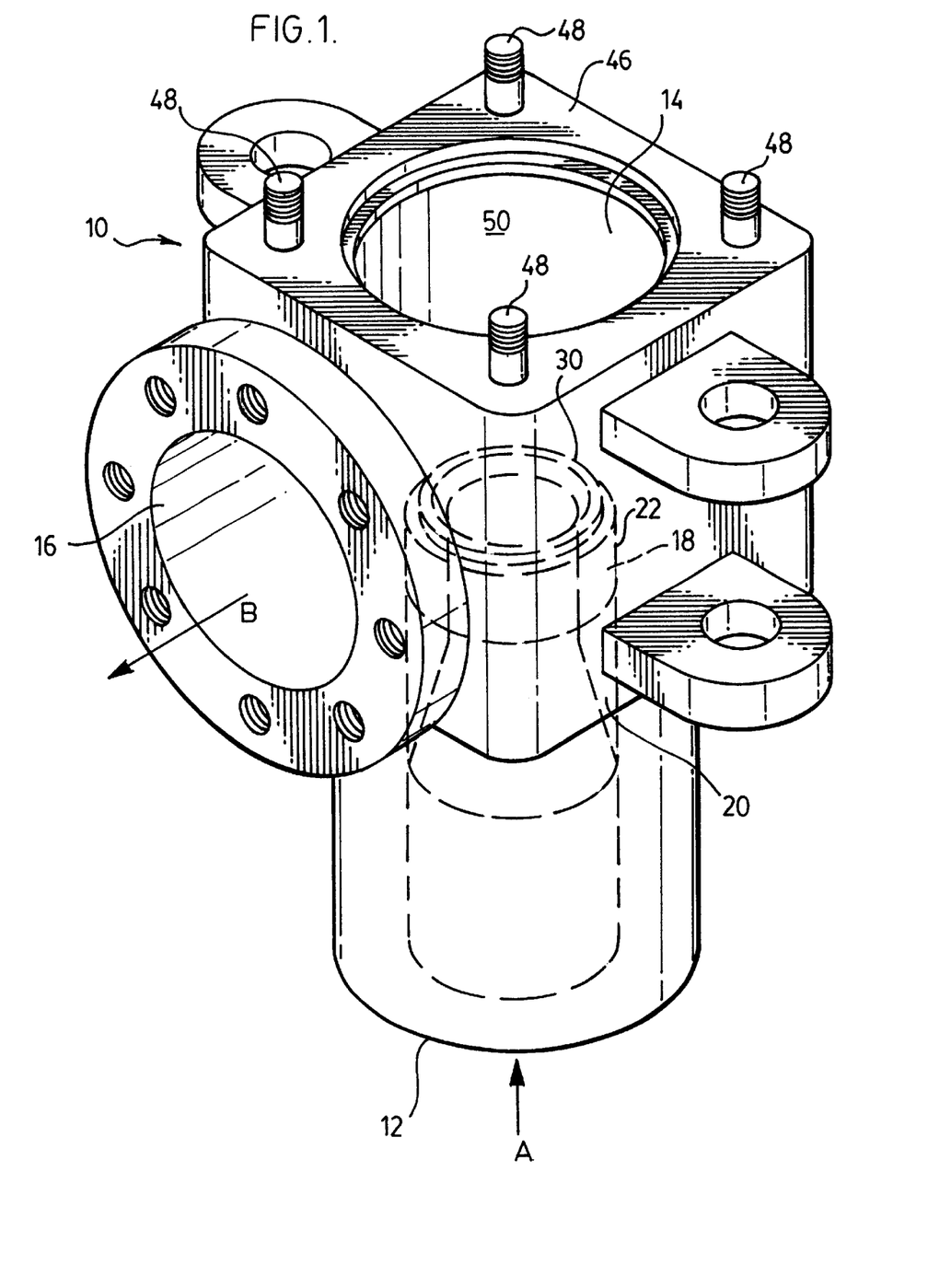
FIG. 1 is a perspective view of the valve body of a conventional high temperature, high pressure safety valve.

FIG. 1 illustrates a valve body 10 of a typical high pressure, high temperature safety valve of the type used in steam systems of power plants. Valve body 10 has an inlet 12, an interior cavity 14 and an outlet 16 which is arranged at about 90° to the inlet 12. Steam travels through the valve from inlet 12 to outlet 16 in the direction indicted by arrows A and B. When installed in a power plant, the valve preferably has the orientation shown in FIG. 1.

Permanently secured inside the inlet 12 of valve body 10 is a generally cylindrical valve nozzle 18 having a lower end 20 seated in the valve inlet and an upper end 22 which projects above a bottom wall 24 of the interior cavity 14 of valve body 10. This is most clearly shown in FIG. 5.

Figure 5:
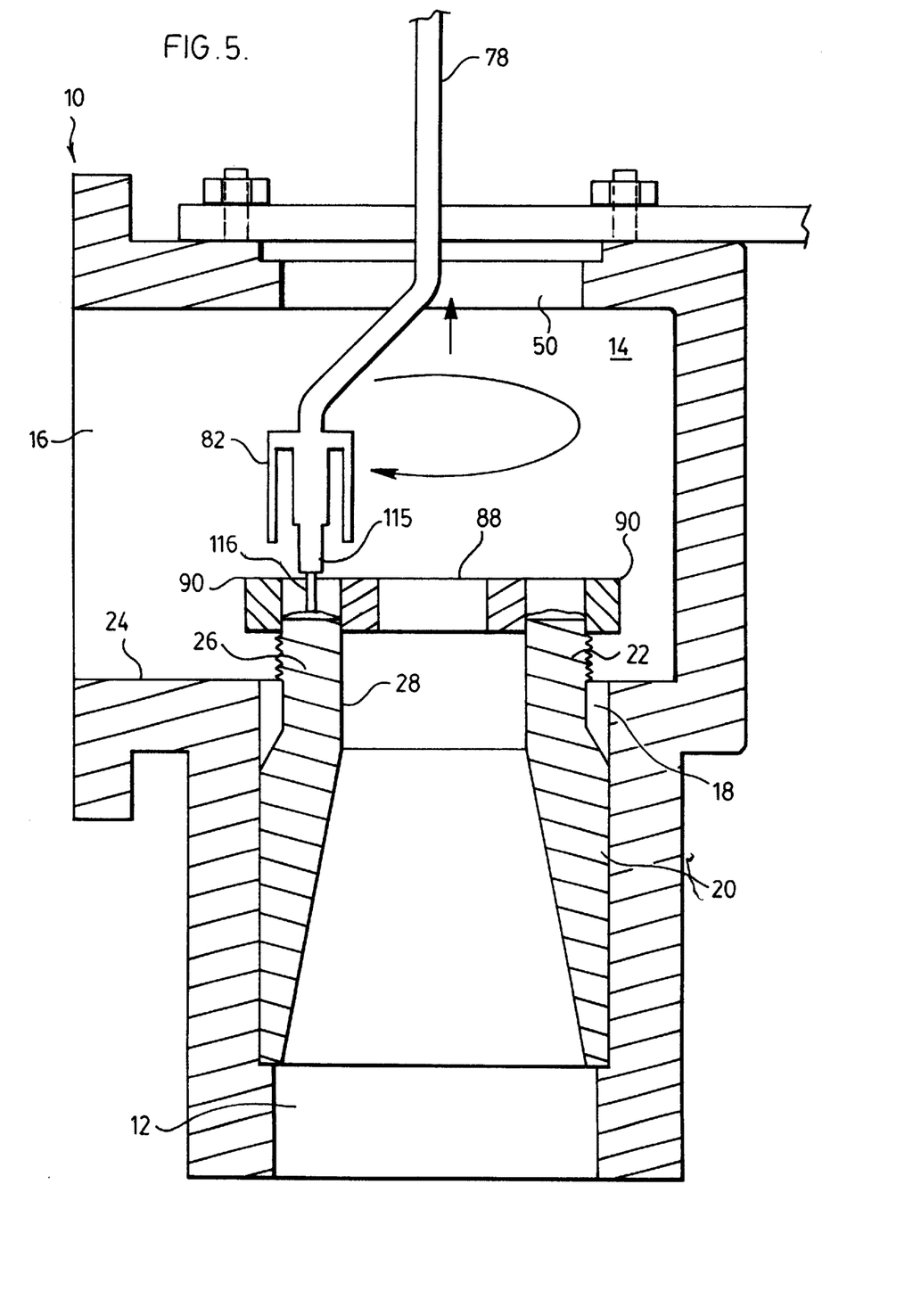
FIG. 5 is a cross-sectional side elevational view of the valve body of FIG. 1 with the mounting plate attached thereto, and with the welding head of the welding apparatus depositing a buildup of weld metal on the valve seat.

As also shown in FIG. 5, the cylindrical wall 26 of valve nozzle 18 has a generally constant thickness in the upper end 22 of nozzle 18, with the inner surface 28 of wall 26 tapering outwardly toward the bottom of the valve nozzle 18 in order to gradually constrict the inlet opening toward the upper end of the valve nozzle 18.

Figure 8:
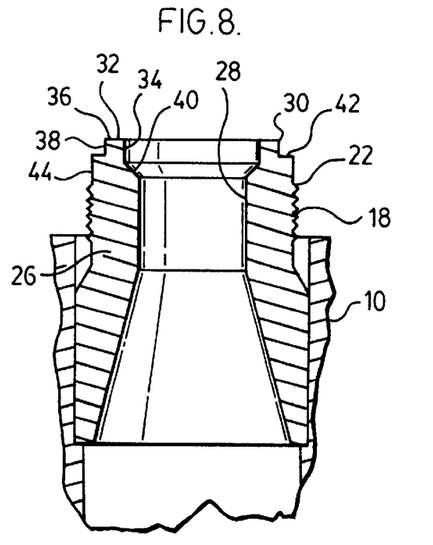
FIG. 8 is a cross-sectional side view of a valve seat prior to refurbishing.

As best shown in FIG. 8, the upper end 22 of valve nozzle 18 is provided with a valve seat 30 which is acted upon by a valve disc (not shown) in order to open and close the valve. FIG. 8 shows a typical valve seat configuration, the valve seat 30 having a centrally located annular upstanding lip 32 of substantially rectangular cross section having a substantially vertical inner wall 34, a substantially horizontal upper wall 36 and a substantially vertical outer wall 38. Located inwardly of annular lip 32 is an inwardly and downwardly sloped portion 40 extending from the vertical inner wall 34 of lip 32 to the substantially vertical inner surface 28 of wall 26 at the upper end 22 of valve nozzle 18. To the outside of annular lip 32 is a horizontal portion 42 extending between the vertical outer wall 38 of lip 32 and the outer surface of valve nozzle 18. To enhance clarity of the drawings, it is to be noted that the size of the lip 32 in relation to the remainder of nozzle 18 is exaggerated in the drawings.

As shown in FIG. 1, the valve body 10 has a flat, substantially horizontal upper surface 46 provided with a plurality of threaded mounting studs 48 to which the bonnet (not shown) of the valve is bolted. The upper surface 46 of valve body 10 is provided with an opening 50 through which access can be gained to valve seat 30 once the valve is disassembled in situ. Once the height of the valve seat 30 has been reduced by ¼ inch from its original height by wear and refinishing, the method and apparatus of the present apparatus are preferably applied in situ in order to restore the valve seat 30 to its original dimensions. Having now described the valve body 10 and valve seat 30, a preferred apparatus according to the present invention will now be described below.

The preferred apparatus of the invention comprises means for shaping the valve seat and means for depositing new metal to build up the valve seat.

Figure 3:
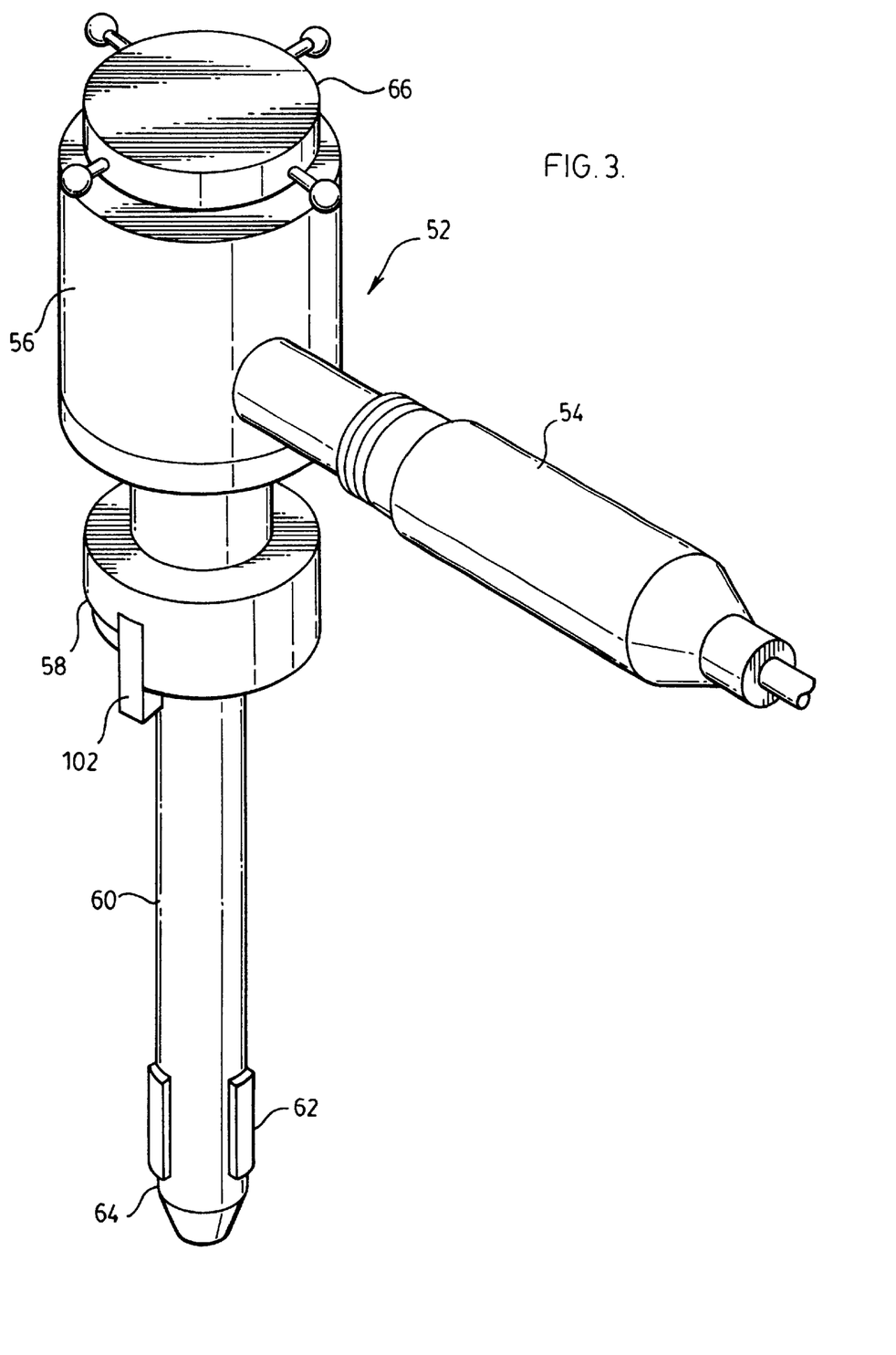
FIG. 3 is a perspective view of a valve machining apparatus for use in the preferred method and apparatus of the present invention.

The shaping means preferably comprises a portable machining apparatus 52, as shown in FIG. 3, having a handle 54, a motor housing 56, a rotating cutter 58, an alignment shaft 60 with an outwardly expanding clamping mechanism 62 located at its distal end 64, and a hand wheel 66 to raise and lower cutter 58. The machining apparatus 52 is attached to valve body 10 by inserting the distal end 64 of alignment shaft 60 into the valve nozzle 18, turning a tightening nut or the like (not shown) to cause the clamping mechanism 62 to exert outward pressure on the inner surface 28 of valve nozzle 18, thereby causing the alignment shaft 60 and the valve nozzle 18 to be aligned in the same direction.

Once the machining apparatus 52 is clamped in the valve nozzle 18, the rotating cutter is rotated in a plane perpendicular to the alignment shaft 60 and is lowered by rotating hand wheel 66 to contact the valve seat 30.

Figure 4:
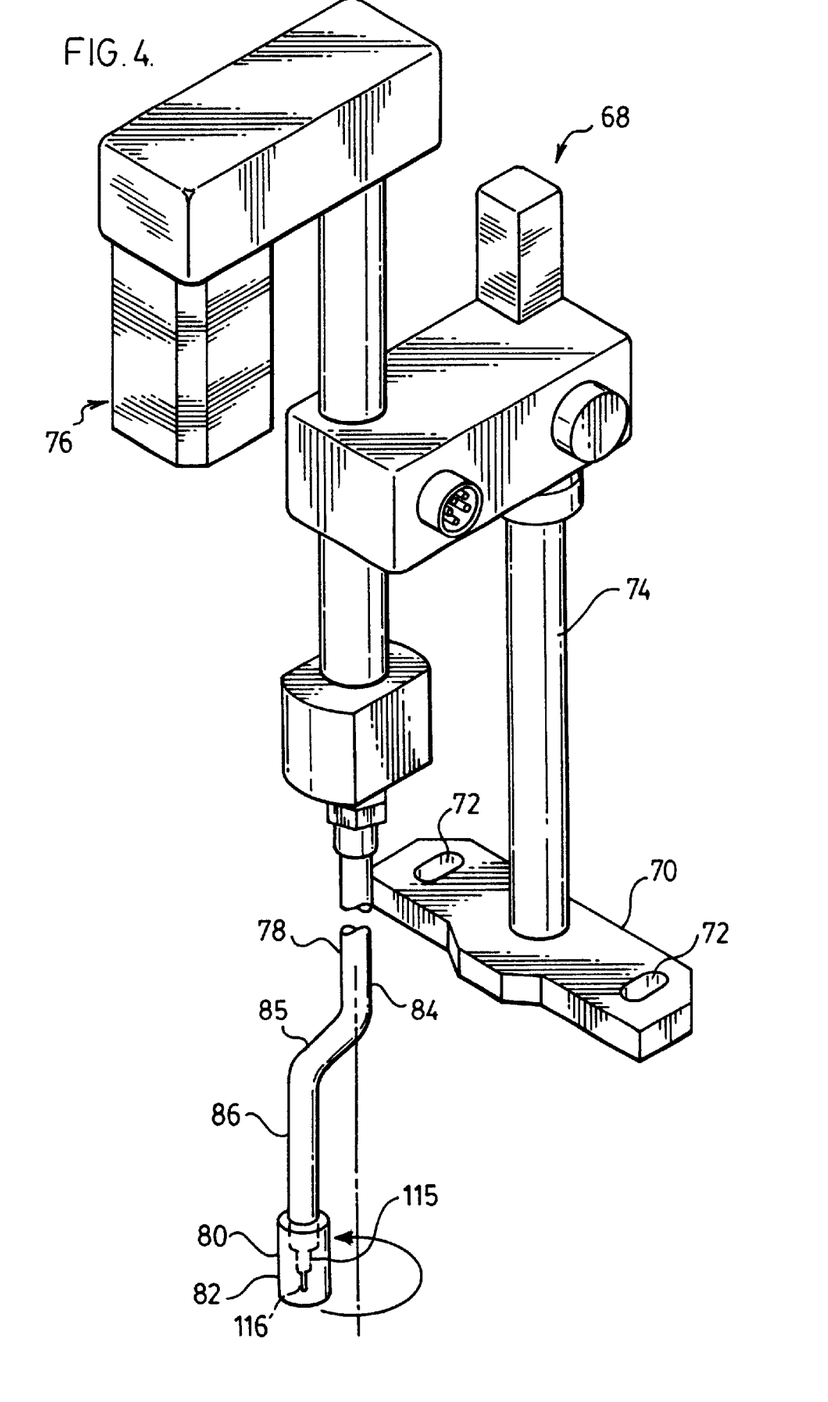
FIG. 4 is a preferred gas metal arc welding apparatus for use in the preferred method and apparatus of the present invention.

The means for adding metal buildup to the valve seat preferably comprises a welding apparatus 68 as illustrated in FIG. 4. Welding apparatus 68 comprises a base plate 70 having a pair of elongate openings 72 for securing the welding apparatus 68 to the valve body 10. Extending vertically upwardly from the base plate 70 is a height adjustable mounting shaft 74 to which a welding device 76 is secured. Welding device 76 includes a generally downwardly extending hollow tube 78, the distal end 80 of which contains a welding nozzle 82, a contact tip 115 and a consumable electrode 116. The tube 78 has upper and lower vertically extending portions 84 and 86 which are connected by a central portion 85 which extends downwardly and radially outwardly, so that the lower vertical portion 86 is spaced radially outwardly from the axis about which tube 78 is rotated. Therefore, rotation of the tube 78 of the welding device 76 causes the welding head 82 to rotate in a circle having substantially the same diameter as valve nozzle 18.

Figure 2:
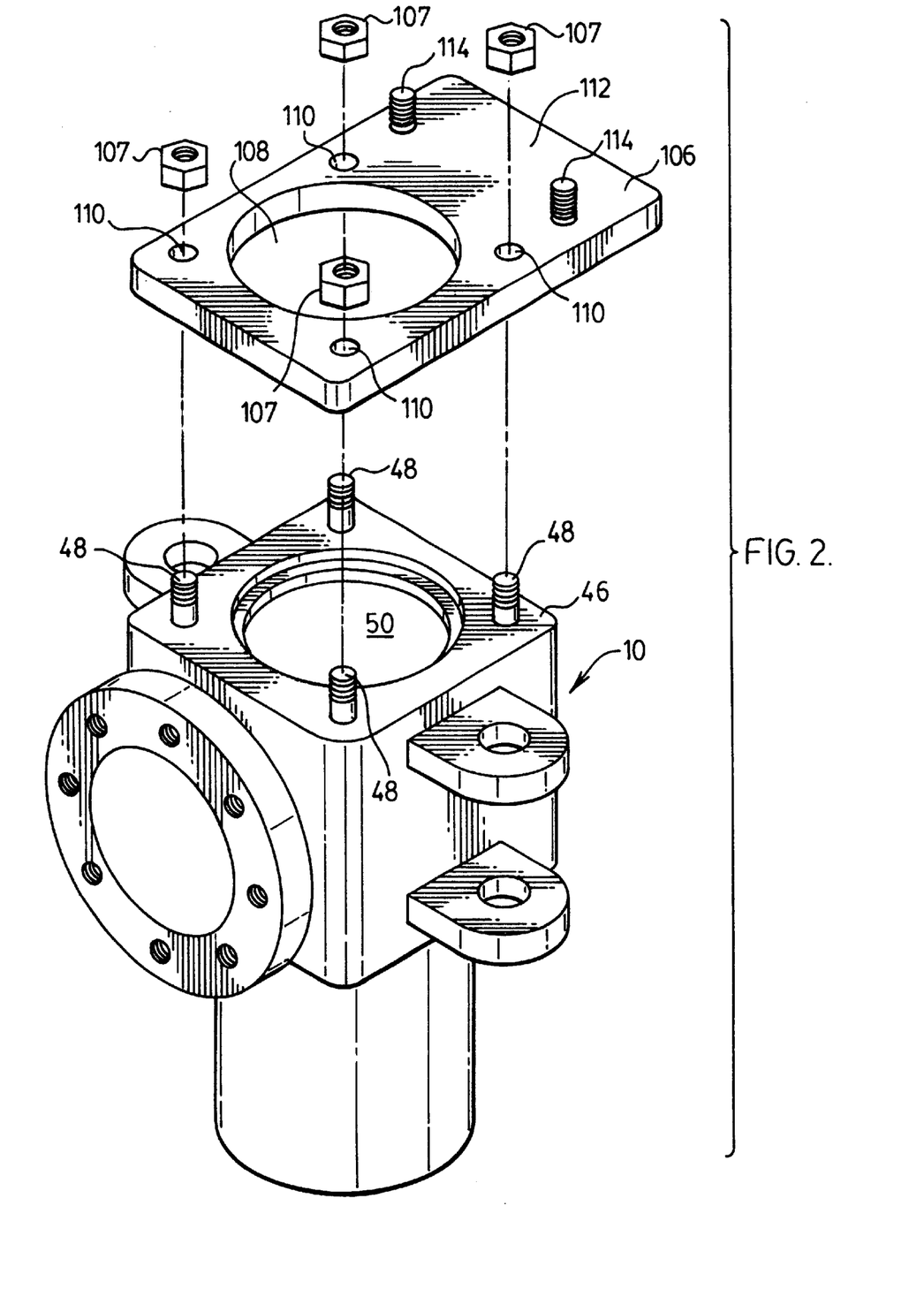
FIG. 2 is a perspective view of the valve body of FIG. 1 illustrating the mounting of a mounting plate of the preferred apparatus to a flat upper surface thereof.

The welding apparatus 68 is preferably supported on a base plate 106 which is mounted to the flat upper surface 46 of valve body 10 as shown in FIG. 2. Base plate 106 has an aperture 108 which registers with the opening 50 in valve body 10 and mounting apertures 110 which allow securement of base plate 106 to threaded studs 48 using nuts 107. In addition, base plate 106 has one side 112 extending outwardly of the aperture 108, the outwardly extending side 112 having a pair of threaded mounting studs 114 to which the base plate 70 of the welding apparatus 68 is secured.

Preferably, the welding device is a gas metal arc welding device. Gas metal arc welding is an example of open arc welding using a fusible electrode, which is to be distinguished from gas tungsten arc welding which uses a non-fusible tungsten electrode. As used throughout this application, the term "gas metal arc welding" includes "flux cored arc welding". Although gas metal arc welding can be significantly faster than gas tungsten arc welding, it is generally believed that gas tungsten arc welding will provide a higher quality buildup with fewer inconsistencies than gas metal arc welding. However, the apparatus of the invention is capable of providing a high quality weld buildup with gas tungsten arc welding due to the use of support structures to support the metal buildup during the welding operation. Preferred examples of support structures are now described below.

Figure 10:
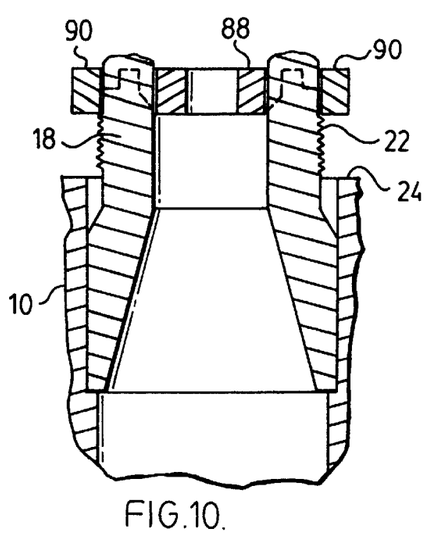
FIG. 10 illustrates the buildup of weld metal between the chill blocks, with the final profile of the valve seat being indicated by dashed lines.
Figure 12:
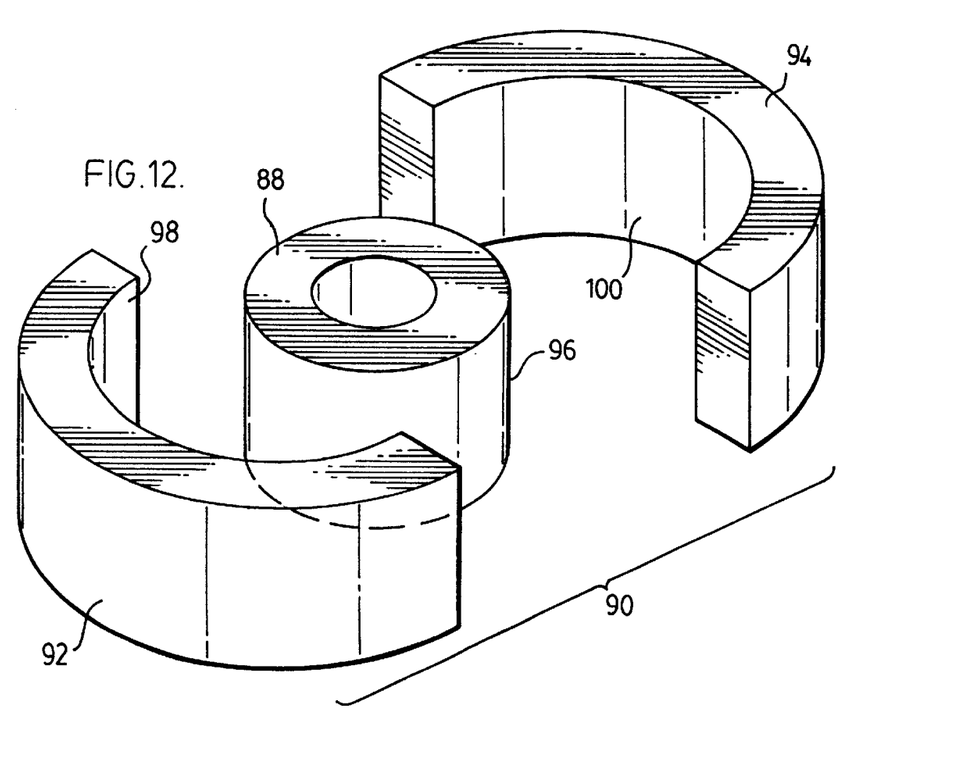
FIG. 12 is a perspective view of the chill blocks of FIGS. 5 and 10 shown in isolation.

Preferred support structures are shown in isolation in FIG. 12, comprising an inner chill block 88 and an outer chill block 90 comprising a pair of C-shaped segments 92 and 94. As shown in FIG. 10, inner chill block 88 comprises a hollow metal sleeve having a cylindrical outer surface which provides an inner support for the metal buildup during the welding operation. As shown in FIG. 10, the inner chill block 88 is mounted inside the upper end 22 of the valve nozzle 18, such that its outer surface 96 provides an inner support for the weld buildup.

Segments 92 and 94 are assembled to form annular outer chill block 90, the substantially vertically extending inner surfaces 98 and 100 of segments 92 and 94 providing an outer support for the weld buildup. Although the support structures shown in the preferred embodiment of the invention comprise chill blocks 88 and 90, alternate support structures could also be used. For example, the inner chill block may be replaced by a solid cylinder of metal or by a support ring having thinner walls than those of chill block 88. However, it is particularly preferred that the support structures have relatively thick walls as shown in the drawings, in order to act as heat sinks and remove heat from the metal deposited by the welding device. The inventors have found that this improves the quality of the weld buildup. Preferably, the chill blocks 88 and 90 are comprised of copper, but may instead be formed of another metal such as stainless steel.

The operation of the preferred apparatus will now be described below.

FIG. 8 illustrates valve nozzle 18 with valve seat 30 seated in valve body 10 prior to refurbishment by the method of the invention. Firstly, the valve is disassembled to expose the valve seat 30 through opening 50 as shown in FIG. 1. Next, the machining apparatus 52 is attached to the valve body 10 by inserting the alignment shaft 60 downwardly through the opening 50 and into the valve nozzle 18. The clamping device 62 is then expanded outwardly to exert outward pressure on the inner surface 28 of valve nozzle 18, thereby securing the machining apparatus 52 with alignment shaft 60 parallel to the valve nozzle 18.

Figure 9:
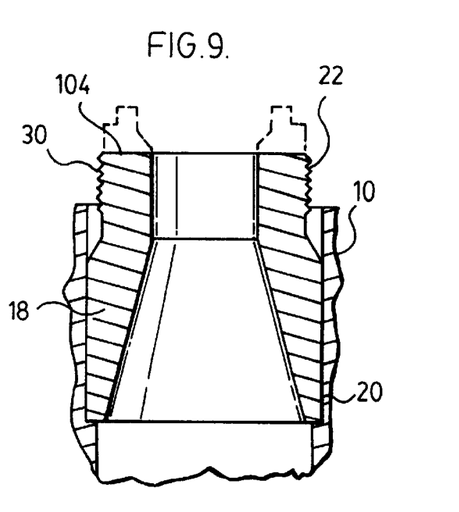
FIG. 9 illustrates a valve seat after the initial machining operation, with the desired profile of the valve seat being shown in dashed lines.

Next, the rotating cutter 58 is activated and is lowered to the valve seat 30 by turning hand wheel 66. In this initial machining operation, the cutter 58 is fitted with a flat cutting head 102 as shown in FIG. 3 in order to machine the valve seat 30 to below the lower end of the inwardly sloped portion 40 as illustrated in FIG. 9. After the initial machining operation, the valve seat 30 has a flat upper surface 104 upon which new metal can be built up.

Following the initial machining operation, the inner chill block 88 is inserted into the upper end of valve nozzle 18 such that its outer surface 96 provides an inner support wall for the weld metal buildup. Similarly, the outer chill block 90 is assembled from C-shaped segments 92 and 94 to clamp the outer surface 44 of valve nozzle 18, thereby providing an outer support wall for the weld metal buildup. Both the inner and outer chill blocks 88 and 90 extend above the flat surface 104 of valve seat 30 to a height which is about the same as the final height of the weld metal buildup. Preferably, the chill blocks have a total height of at least about 1 inch and extend above the flat surface 104 of valve seat 30 by about ½ to 1 inch. The inner chill block 88 preferably has a diameter to be closely received inside the valve nozzle, preferably 2.5 to 3 inches. The outer chill block 90 preferably has a thickness of about ½ to ¾ inches.

Next, the base plate 106 is secured to the flat upper surface 46 of valve body 10 as described above. The welding apparatus 68 is then attached to the base plate 106 with the tube 78 containing the welding head 82 extending downwardly through the opening 50 in the valve body 10. In order to ensure proper positioning of the welding head 82 relative to valve seat 30 as in FIG. 5, the elongate openings 72 in base plate 70 of the welding apparatus 68 allow front to rear alignment of the welding apparatus 68 relative to the valve seat 30.

After mounting and positioning the welding apparatus 68, the welding operation is commenced by rotating tube 78 about a vertical axis and depositing weld metal from consumable electrode 116 on the flat upper surface 104 of valve seat 30. Rotation of the welding head 82 and deposition of weld metal is continued until the weld buildup reaches a height dimension which is at least as great as the final height dimension of the valve seat, as illustrated in FIG. 10, showing the height of the final weld buildup being slightly higher than the tops of the chill blocks 88 and 90, and being greater than the final dimensions of the valve seat 30 shown in dashed lines.

Figure 6:
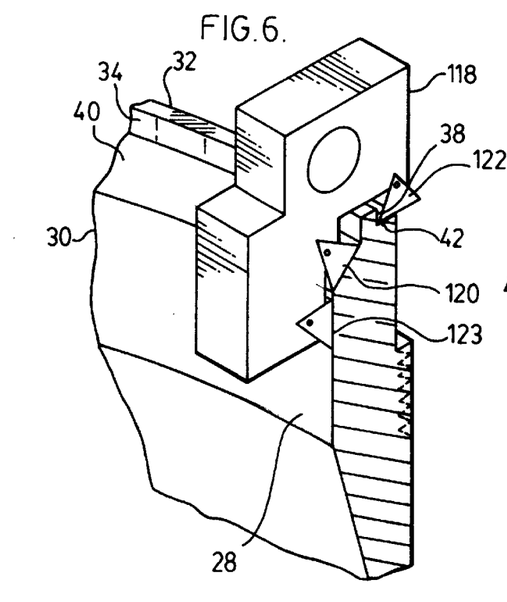
FIGS. 6 and 7 illustrate machining heads for machining the buildup of weld metal to the final dimensions of the valve seat.
Figure 7:
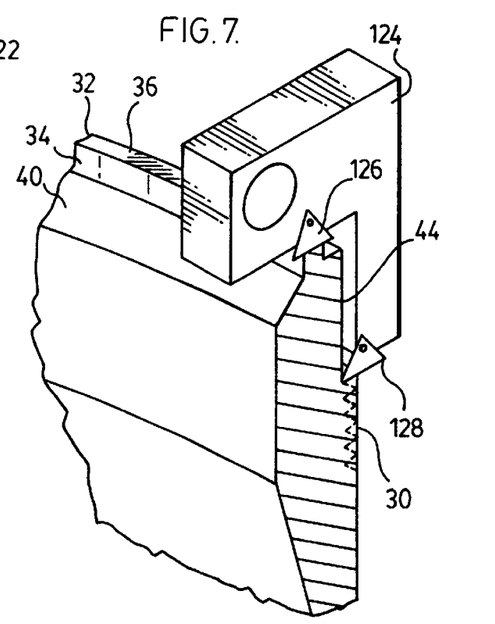
Figure 11:
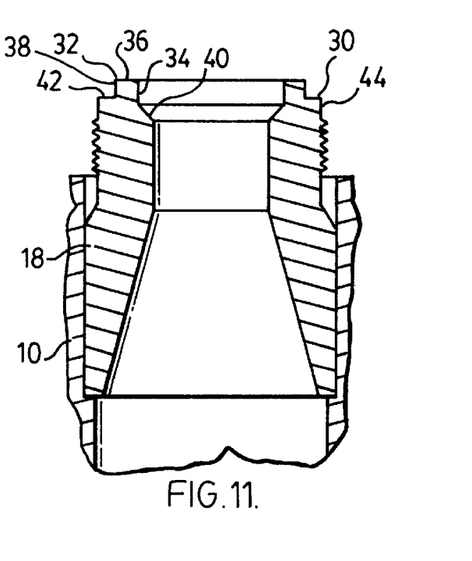
FIG. 11 is a cross-sectional side view of the valve seat after the final machining operation.

After the completion of the weld metal buildup as shown in FIG. 10, the welding apparatus 68 is removed from the valve body 10 and the machining apparatus 52 is re-installed as described above. The desired profile of the valve seat is restored to that shown in FIG. 11 by using a plurality of cutter heads, two of which are illustrated in FIGS. 6 and 7. The cutter head 118 shown in FIG. 6 has a first cutter 120 which restores the vertical inner wall 34 of annular lip 32 and the inwardly sloped portion 40, a second cutter 122 which restores the vertical outer wall 38 and the outer horizontal portion 42 of the valve seat 30, and a third cutter 123 which restores the vertical portion of inner surface 28.

Cutter head 124 illustrated in FIG. 7 includes a first cutter 126 to restore the horizontal upper wall 36 of the annular lip 32, and a second cutter 128 which restores the outer surface 44 of the valve seat 30. Once the profile of the valve seat 30 is restored by rough and fine machining, it is manually lapped in order to provide a smooth finish to the restored seat. Preferably, the final dimensions of the restored valve seat 30 are substantially identical to the dimensions of a new valve seat.

Although the invention has been described in connection with certain preferred embodiments, it is not intended to be limited thereto. Rather, the invention includes all embodiments which may fall within the scope of the following claims.

What is claimed is:

1. An apparatus for refurbishing a worn valve seat of a high temperature, high pressure safety valve in situ, said valve seat being generally circular and being provided at one end of a hollow, cylindrical valve nozzle which is attached to a valve body of said valve, said valve seat being accessible through an access opening in said valve body located above said valve seat, said apparatus comprising:

(a) valve machining means mountable to said valve, said valve machining means having first cutter means extendable into the valve body through the access opening for initially machining the worn valve seat to a flat annular surface having an inner perimeter and an outer perimeter;

(b) a gas metal arc welding apparatus mountable to the valve having a welding head with a consumable electrode, the welding head being extendable through the access opening and being rotatable in a circle located substantially parallel to and above the flat surface of the valve seat to deposit a buildup of weld metal from said consumable electrode onto said flat surface; and (c) a pair of metal support structures for supporting the buildup of weld metal as it is being deposited by the gas metal arc welding apparatus, said pair of support structures comprising:

(i) an inner support structure which is positioned inwardly of the inner perimeter of the flat surface during deposition of the weld metal buildup and which has an outer, substantially vertical cylindrical surface which forms an inner support wall for the weld metal buildup, said inner support wall having a height sufficient to support the weld metal buildup; and (ii) an outer support structure which surrounds the outer perimeter of the flat surface during deposition of the weld metal buildup and which has an inner, substantially vertical cylindrical surface which forms an outer support wall for the weld metal buildup, said outer support wall being located proximate the outer perimeter of the flat surface and having a height sufficient to support the weld metal buildup;

said valve machining means also having second cutter means extendable into the valve body through the access opening for machining the weld metal buildup to a desired final height and profile.

2. The apparatus of claim 1, wherein said inner support structure comprises a cylindrical metal sleeve, a cylindrical outer surface of which corresponds to the substantially vertical cylindrical surface of the inner support structure.

3. The apparatus of claim 1, wherein said height sufficient to support the weld metal buildup is about the same as a final height of the weld metal buildup.

4. The apparatus of claim 3, wherein the inner support structure is received inside the end of the valve nozzle in which the valve seat is provided.

5. The apparatus of claim 1, wherein the outer support structure comprises an annular block of metal, a cylindrical inner surface of which corresponds to the inner, substantially vertical cylindrical surface of the outer support structure.

6. The apparatus of claim 5, wherein the annular block of metal comprising the outer support structure is made up of two C-shaped segments which are releasably connectable to one another.

7. The apparatus of claim 6, wherein the end of the valve nozzle on which the valve seat is provided protrudes above a surface of the valve body immediately adjacent to said valve seat, and wherein the two C-shaped segments of the outer support structure clamp an outer cylindrical surface of the end of the valve nozzle.

8. The apparatus of claim 1, wherein said valve machining means includes a central alignment shaft having a distal end provided with outwardly expanding clamping means which secure the distal end of the alignment shaft inside the valve nozzle with the alignment shaft protruding substantially vertically therefrom, said first cutter means being rotatable about said shaft and being movable axially along said shaft.

9. The apparatus of claim 1, wherein said access opening of said valve body has a flat outer surface situated above and substantially parallel to the flat surface of the valve seat, said apparatus further comprising a mounting plate to which a base of the gas metal arc welding apparatus is secured, said mounting plate being attachable to the flat outer surface of the access opening and having a side extending horizontally outwardly from said access opening, the outwardly extending side of the mounting plate having mounting means for attachment to the base of the gas metal arc welding apparatus.

10. The apparatus of claim 9, wherein the base of the gas metal arc welding apparatus is provided with mounting apertures which receive a plurality of studs extending upwardly from the outwardly extending side of the mounting plate.

11. The apparatus of claim 10, wherein the mounting apertures in the base of the gas metal arc welding apparatus are in the form of parallel slots which permit adjustment of the base of the gas metal arc welding apparatus relative to the access opening.

12. A method for refurbishing a worn valve seat of a high temperature, high pressure safety valve in situ, said valve seat being generally circular and being provided at one end of hollow, cylindrical valve nozzle which is attached to a valve body of said valve, said valve seat being accessible through an access opening in said valve body located above said valve seat, the method comprising:

(a) initially machining the worn valve seat to a flat annular surface having an inner perimeter and an outer perimeter using a valve machining means mounted to the valve body and having cutter means extending into the valve body;

(b) installing an inner support structure inwardly of the inner perimeter of the flat surface of the valve seat, said inner support structure having an outer, substantially vertical cylindrical surface which is located proximate the inner perimeter of the flat surface and extends above the flat surface to at least a predetermined height;

(c) installing an outer support structure outwardly of the outer perimeter of the flat surface of the valve seat, said outer support structure having an inner, substantially vertical cylindrical surface which is located proximate the outer perimeter of the flat surface and extends above the flat surface to at least said predetermined height;

(d) depositing a buildup of weld metal on said flat surface between said support structures, using a gas metal arc welding apparatus mounted to the valve and having a welding head with a consumable electrode extending through the access opening into the valve body, the buildup of weld metal being deposited while rotating the welding head in a circle substantially parallel to and above the flat surface of the valve seat so as to deposit a buildup of uniform thickness to approximately the predetermined height; and (e) machining the buildup of weld metal to the final desired height, thickness and profile of the refurbished valve seat.

* * * * *